Dec. 4, 1928.
R. B. LEWIS
1,694,188
MECHANISM FOR PREVENTING LOST MOTION
Filed Jan. 26, 1928
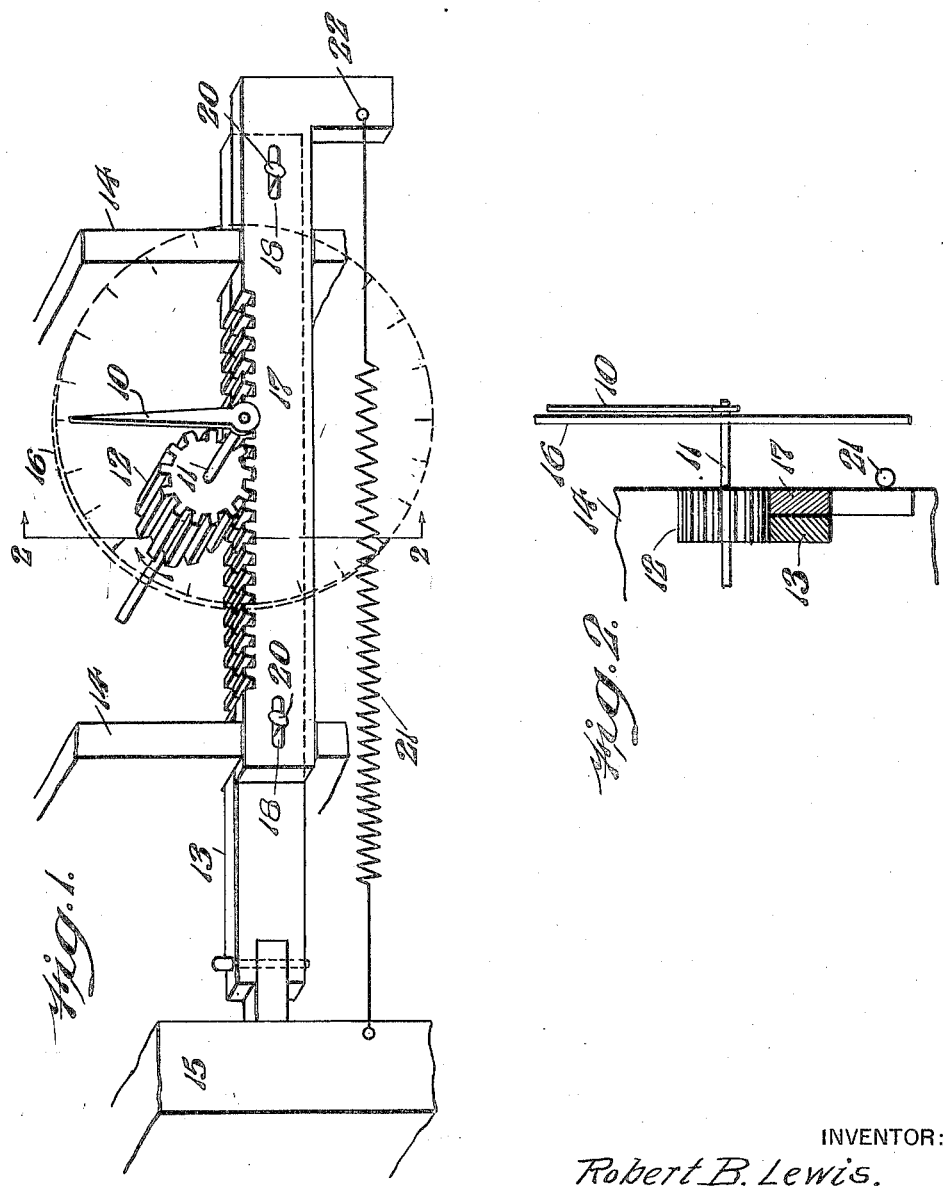
INVENTOR:
Robert B. Lewis,
BY Robert M. Barr.
ATTORNEY.

Patented Dec. 4, 1928.

1,694,188

UNITED STATES PATENT OFFICE.

ROBERT B. LEWIS, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA.

MECHANISM FOR PREVENTING LOST MOTION.

Application filed January 26, 1928. Serial No. 249,577.

The present invention relates to a device for automatically compensating for wear between two mechanical parts and the accurate transmitting of motion from one part to another.

In the various arts and more particularly in indicating devices, such as gages, testing instruments, and many other machines and apparatus, lost motion, due to wear and other causes, introduces an element of error which prevents true and accurate readings being obtained. Some of the objects of the present invention are to provide a device whereby the motion of a part can be transmitted without loss; to provide a mechanism of simple yet efficient construction for eliminating lost motion; to provide a device operable in one form thereof as a control for the pointer of an indicating instrument whereby a given movement causes the pointer to assume a position exactly corresponding to this translated movement to furnish an accurate reading upon a scale; to provide a device for automatically overcoming the errors caused by lost motion; and to provide other improvements as will hereinafter appear.

In the accompanying drawings, Fig. 1 represents a perspective of a device embodying one form of the present invention; and Fig. 2 represents a section on line 2—2 of Fig. 1.

Referring to the drawings, one form of the present invention is shown as applied to the operation of a pointer 10 of an indicator, which, in the present instance, is employed as a measure of the movement transmitted. The pointer 10 is fast to a spindle 11 which carries a pinion 12 fast thereon for the purpose of transmitting movement thereto and thence to the pointer 10.

In order to cause the pinion 12 to turn, it is mounted in mesh with a rack 13 which is free to slide in fixed guides 14 and has one end rigidly connected to a bar 15. The opposite end of the rack 13 is free to move in the guides 14 and receives its motion by movement of the bar 15, and it is the movement of the latter which it is here sought to measure through the medium of the pointer 10 operating in conjunction with a dial 16 graduated in suitable units. It will be evident that while the pinion 12 and rack 13 are accurately fitted, the movement of one will be truly transmitted to the other, but where wear has taken place and there is a lost motion between the two parts an element of error is introduced so that the reading of the pointer 10 is not a true and accurate reading of the amount of movement of the bar 15.

For the purpose of preventing error due to lost motion, the pinion 12 is also in mesh with a second rack 17 which is arranged in substantially side to side abutting relation with the rack 13 but is free to move relative to the aforesaid rack 13. Thus, in this instance, the rack bar 17 is provided with slots 18 which respectively receive pins 20 fast to and projecting from the side of the rack 13. This slotted pin construction maintains the rack bar 17 in proper operative alignment with the bar 13, while a spring 21 is stretched between a lug 22 of the rack bar 17 and the bar 15. Since the rack bar 17 is also freely slidable in the guides 14 and is constantly pulled by the spring 21 toward the bar 15, it will be evident that one tooth of the pinion 12 will be pressed at one side by a tooth of the spring pressed rack 17 while its opposite side will be pressed against a tooth of the rack 13. In this way, wear between the rack teeth parts and the pinion teeth is automatically compensated and no lost motion can possibly take place.

In the operation of the present device, it will be assumed that the motion to be measured is transmitted to the bar 15 so that it moves to the left as seen in Fig. 1. This movement also draws the rack 13 to the left, and at once the spring 21 causes the rack 17 to move in the same direction maintaining its pressure against the teeth of the pinion so that the latter rotates a distance which represents an accurate measure of the movement transmitted to the bar 15, and as the pointer 10 is correspondingly rotated it will assume a position upon the indicating dial so that a reading can be taken as a measure of the movement.

From the foregoing, it will now be apparent that a complete unitary device has been devised whereby motion of a part can be accurately measured and indicated without the introduction of an error due to lost motion and which is accurate irrespective of the direction of movement of a part, the motion of which is to be measured. Furthermore, since the motion transmitting parts are maintained constantly pressing against a pinion, there is no chance of wear becoming a factor in the resulting indication.

Having thus described my invention, I claim:

1. In a device of the character stated, the combination of a pinion, a rack in mesh with said pinion, a second rack in mesh with said pinion and mounted for relative movement with respect to said first rack, guides for respectively supporting said racks, a bar connected to one end of said first rack, and a spring stretched between said bar and said second rack whereby lost motion between said pinion and racks is prevented.

2. In a device of the character stated, an indicating pointer, means including a pinion for operating said pointer, a rack in mesh with said pinion, a second rack also in mesh with said pinion and mounted for movement relative to said first rack, guides for the respective racks, a bar connected to one end of said first rack and a spring stretched between said bar and said second rack whereby lost motion is prevented and said pointer indicates the exact movement of said first rack.

Signed at Philadelphia, county of Philadelphia, State of Pennsylvania, this 25th day of January, 1928.

ROBERT B. LEWIS.